(12) United States Patent
Jia et al.

(10) Patent No.: US 12,363,201 B2
(45) Date of Patent: Jul. 15, 2025

(54) SOFTWARE DEFINED METAVERSE PLATFORM

(71) Applicant: AT&T Intellectual Property I, L.P., Atlanta, GA (US)

(72) Inventors: Yupeng Jia, South Pasadena, CA (US); Hongyan Lei, Plano, TX (US); Venson Shaw, Kirkland, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 342 days.

(21) Appl. No.: 17/985,283

(22) Filed: Nov. 11, 2022

(65) Prior Publication Data
US 2024/0161412 A1    May 16, 2024

(51) Int. Cl.
*G06F 15/173*    (2006.01)
*H04L 67/50*    (2022.01)

(52) U.S. Cl.
CPC ................... *H04L 67/535* (2022.05)

(58) Field of Classification Search
None
See application file for complete search history.

(56) References Cited

U.S. PATENT DOCUMENTS

2022/0030214 A1*  1/2022  Sinharoy .............. H04N 13/194

* cited by examiner

*Primary Examiner* — Wing F Chan
*Assistant Examiner* — Andrew Woo
(74) *Attorney, Agent, or Firm* — Guntin & Gust, PLC; Andrew Gust

(57) ABSTRACT

Aspects of the subject disclosure may include, for example, receiving a first request for a first communication service from a first end user device operated by a first user, where the first request provides or can be utilized to obtain first service information associated with first service parameters corresponding to the first user according to a first root ID provided to the first end user device by the first user; providing, over a network, first immersive media for presentation by the first end user device in response to the first request, where the first immersive media is provided utilizing the first network slice, the first spectrum resource allocation, and the first RAT that are selected according to the first service parameters. Other embodiments are disclosed.

20 Claims, 7 Drawing Sheets

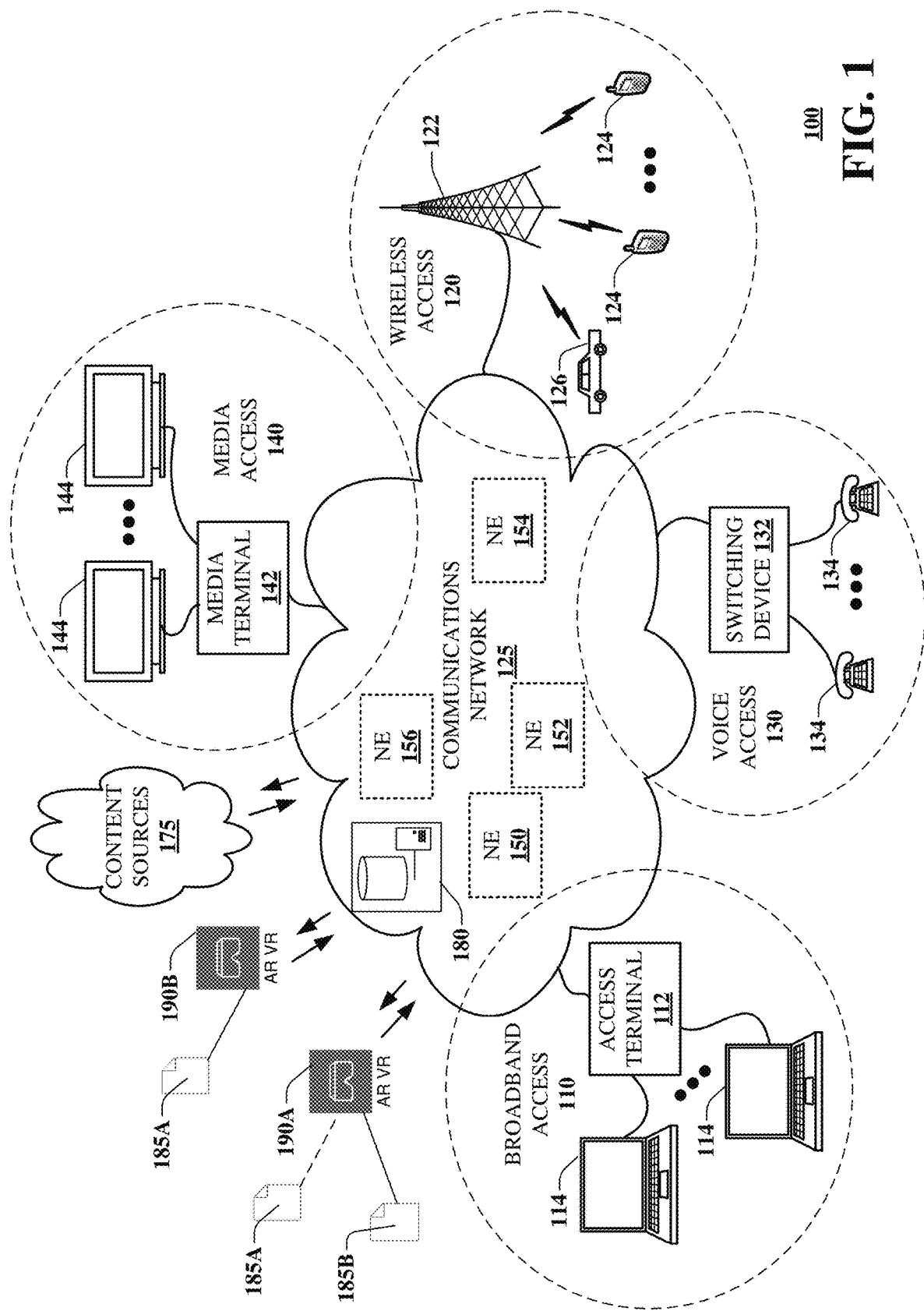

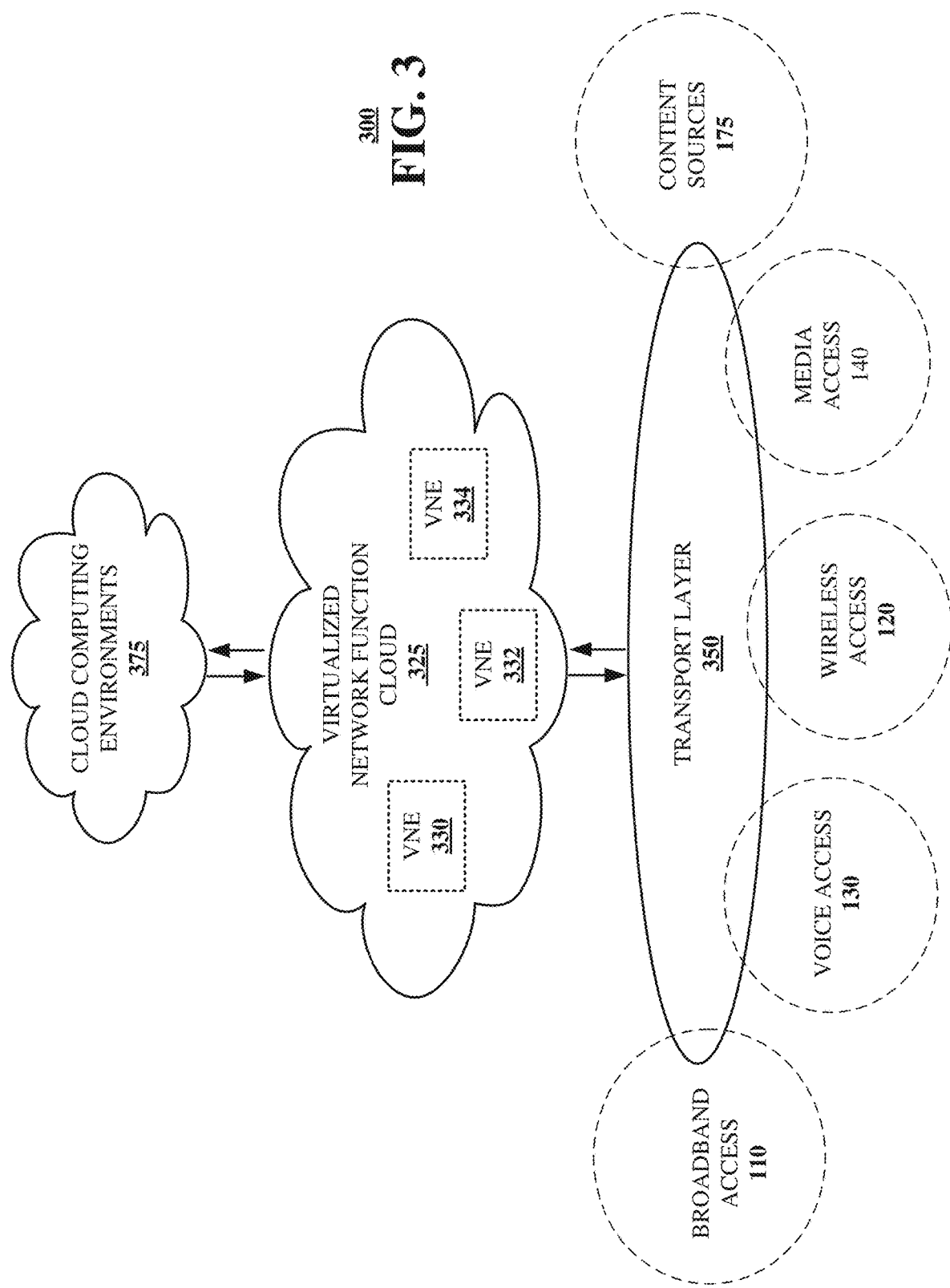

SOFTWARE DEFINED METAVERSE PLATFORM

FIELD OF THE DISCLOSURE

The subject disclosure relates to a software defined metaverse platform.

BACKGROUND

As metaverse technology progresses, the variety of devices increases, such as hats, goggles, gloves, vests, etc. Users may find it difficult to purchase and to carry all of these devices around. Metaverse has been viewed as the next generation digital user experience, including virtual workspace, health care, entertainment, and so forth. There are multiple options to connect to the metaverse, such as via a personal computer, smartphone, virtual reality device, augmented reality device, and so forth, which can provide 2D, 3D . . . xD immersive connection experiences.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 3 is a block diagram illustrating an example, non-limiting embodiment of a virtualized communication network in accordance with various aspects described herein.

DETAILED DESCRIPTION

Figure 2A:
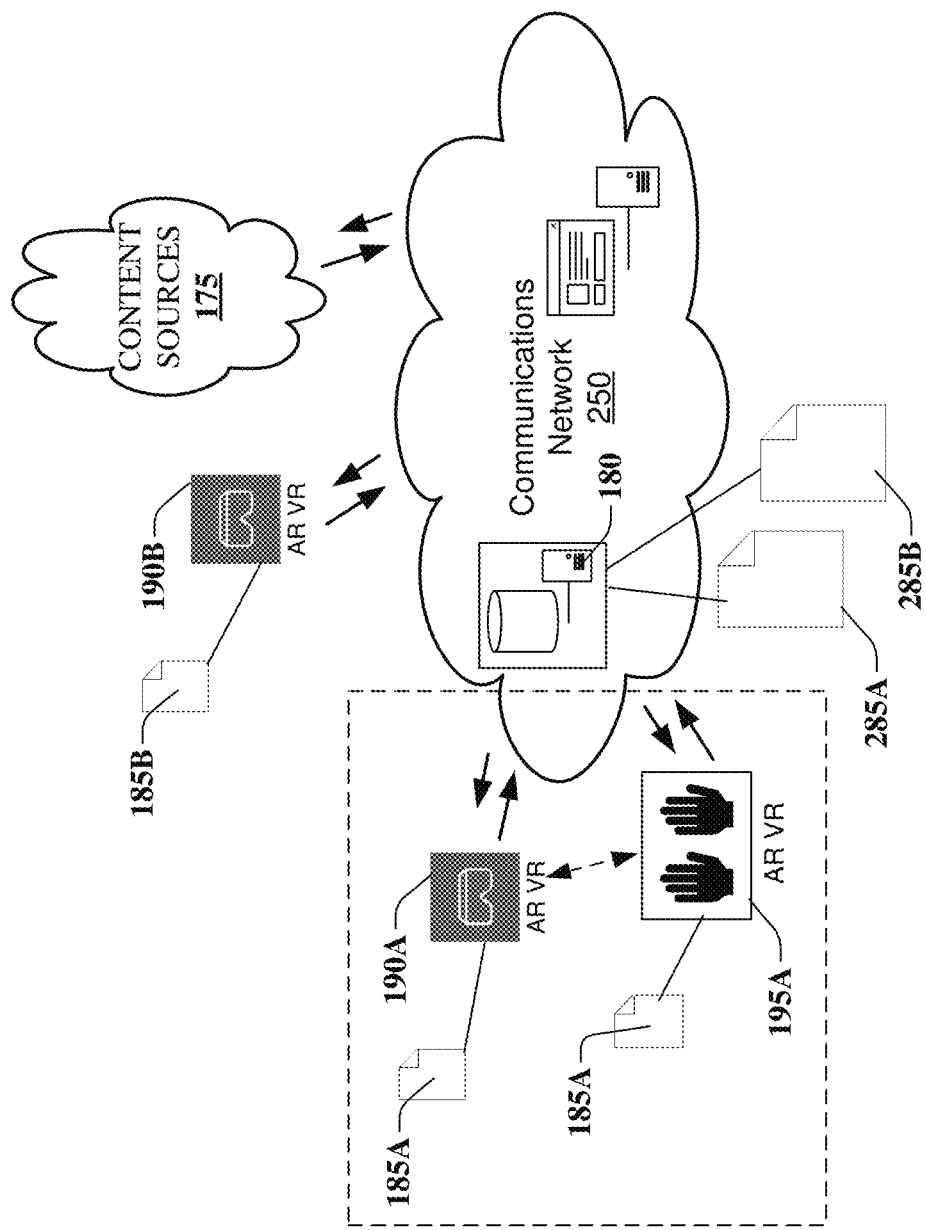
FIG. 2A is a block diagram illustrating an example, non-limiting embodiment of a system functioning within the communication network of FIG. 1 in accordance with various aspects described herein.

The subject disclosure describes, among other things, illustrative embodiments for a software-defined metaverse platform, which can encompass a device, RAN, and/or service transformer. In one or more embodiments, a software-defined platform can fit into or be used with different applications. In one or more embodiments, a metaverse platform transformer is provided to serve different purposes, different applications, and/or different services. In one or more embodiments, the metaverse platform can be used with groups of devices, such as providing a mesh device transformation where the focus is not limited to a single device, but rather provides a mesh network of devices for use in the metaverse service(s). In one or more embodiments, a RAN can behave as a transformer to provide dynamic and flexible configurations for delivering metaverse services. In one or more embodiments, the platform can operate as a service transformer where end users, having distinct and sometimes dramatically different expectations/requirements from/for the network, are provided with a desired or improved metaverse experience through the flexibility of the software-defined platform functionality applied to the device and the RAN.

In one or more embodiments, a software-defined metaverse platform is provided which can be based on open device/RAN/service transformation. In one or more embodiments, a metaverse key (e.g., a root ID) can be generated or defined for a user. This metaverse key can be used to activate and transform a physical device into a metaverse device, with the assistance from a software-defined RAN/service platform. In one or more embodiments, users will not need to buy and carry all the specific metaverse devices, but rather utilize the metaverse key to turn a generic metaverse device(s) into the user's customized metaverse device, such as through a software-defined E2E device-RAM-service metaverse platform. In one or more embodiments, users can enjoy the metaverse experience anytime, anywhere, and for any type of applications/services.

In one or more embodiments, a metaverse device open platform, open software stack, and/or open interface is provided that will enable a software-defined metaverse device ecosystem, bringing with it a rich metaverse experience with flexibility, low cost, efficiency, and scalability. In one or more embodiments, a network-based metaverse-aware scheduling functionality is provided that can dynamically allocate network resources to optimize or improve the metaverse experience and network resource efficiency. In one or more embodiments, a combined device and network software-defined capability can enable metaverse service transformation and ecosystem progress.

In one or more embodiments, a metaverse or other digital experience can be provided which can include a set of technologies that combine to create an immersive experience for one or more users. In one embodiment, the immersive experience may occur in a persistent virtual world that continues to exist even after a user(s) has left the virtual world. In one embodiment, immersive media can be presented at an end user device(s) which can include content presented to a user(s) from a first-person perspective, and which can provide the illusion that the user(s) is present within the content rather than observing the content from the outside. In one embodiment, a metaverse can be provided that is one type of immersive experience which can be an extensive, shared, interactive, always-on virtual world, such as with a fully functioning economy that operates in real time.

In one or more embodiments, the immersive media or metaverse world(s) can be created using immersive reality (IR), augmented reality (AR), virtual reality (VR), mixed reality (MR) and/or extended reality (XR). In one or more embodiments, the components, concepts and techniques described herein may be extended to all similar or related technologies. In some examples, immersive media or a metaverse experience can include an online or digital economy where users can create, buy and sell goods and services.

In one or more embodiments, the metaverse device open platform, open software stack, and/or open interface, which enables a software-defined metaverse device ecosystem, can be applicable to other digital environments, immersive experiences, media, and so forth, whether persistent or temporary (including constructed and torn down by the user(s)). Other embodiments are described in the subject disclosure.

One or more aspects of the subject disclosure include a device, comprising: a processing system including a processor; and a memory that stores executable instructions that, when executed by the processing system, facilitate performance of operations. The operations can include receiving first input that indicates a first root ID of a first user, and providing a first request to a network server for a first communication service. The operations can include receiving first immersive media for presentation in response to the first request, where the first immersive media is provided over a network utilizing a first network slice, a first spectrum resource allocation, and a first RAT that is selected according to first service information corresponding to the first root ID. The operations can include presenting the first immersive media. The operations can include receiving second input that indicates a second root ID of a second user, and providing a second request to the network server. The operations can include receiving second immersive media for presentation in response to the second request, where the second immersive media is provided over the network utilizing at least one of a second network slice, a second spectrum resource allocation, or a second RAT that is selected according to second service information corresponding to the second root ID. The operations can include presenting the second immersive media.

One or more aspects of the subject disclosure include a method, comprising receiving, by a processing system including a processor of a network server, a first request from a first end user device for a first communication service, wherein the first end user device is being utilized by a first user. The method can include selecting, by the network server, a first network slice, a first spectrum resource allocation, and a first RAT according to first service information corresponding to a first root ID provided to the first end user device by the first user. The method can include providing, over a network, first immersive media for presentation by the first end user device in response to the first request, where the first immersive media is provided utilizing the first network slice, the first spectrum resource allocation, and the first RAT. The method can include receiving, by the network server, a second request from a second end user device for a second communication service, where the second end user device is being utilized by the first user. The method can include selecting, by the network server, a second network slice, a second spectrum resource allocation, and a second RAT according to the first service information corresponding to the first root ID provided to the second end user device by the first user. The method can include providing, over the network, second immersive media for presentation by the second end user device in response to the second request, wherein the second immersive media is provided utilizing the second network slice, the second spectrum resource allocation, and the second RAT.

One or more aspects of the subject disclosure include a non-transitory machine-readable medium, comprising executable instructions that, when executed by a processing system including a processor of a first end user device, facilitate performance of operations. The operations can include receiving an input that indicates a root ID of a user, and providing a request to a network server for a communication service. The operations can include receiving immersive media for presentation in response to the request, where the immersive media is provided over a network utilizing a network slice, a spectrum resource allocation, and a RAT that are selected according to service parameters associated with the user according to the root ID. The operations can include presenting the immersive media as part of an XR service. The operations can include communicating with a second end user device of the user to facilitate synchronizing the immersive media with stimuli provided via the second end user device.

Referring now to FIG. 1, a block diagram is shown illustrating an example, non-limiting embodiment of a system 100 in accordance with various aspects described herein. System 100 can utilize metaverse keys 185 (e.g., a root ID) which can be generated or defined for a user, and which can activate and transform a physical device into a metaverse device, such as with the assistance from a software-defined RAN/service platform. As an example, a first end user device 190A (illustrated as AR/VR goggles but can be other types of end user devices including wearable devices, smartphones, etc.) can be operated by a first user via metaverse key 185A. For instance, the first end user device 190A can receive first input that indicates a first root ID of a first user (i.e., the metaverse key 185A), which can be in various forms including unique user name/password, biometrics, hardware key, key fob, and so forth. According to the first root ID, the first end user device 190A can provide a first request to a network server 180 (or other functionality including virtual machine(s)) for a first communication service, such as a metaverse service including gaming, virtual world, video conferencing, ecommerce, educational, and so forth. As an example, the first request can include or be utilized to obtain first service information associated with first service parameters corresponding to the first user according to the first root ID. This first request can result in the first end user device 190A receiving and presenting first immersive media, which is provided over the network 125 (from a content source(s) of the network and/or a third party content provider(s) 175) utilizing a first network slice(s), a first spectrum resource allocation(s), and a first RAT(s) that is selected (e.g., by the server 180 or other network element) according to the first service parameters. In one or more embodiments, the first service parameters can be defined in the first service information (e.g., latency and throughout requirements) and/or can be derived (e.g., by the server 180 or other network element) from the first service information, such as a description of the QoS level expected by the user or a description of the service being sought. In one or more embodiments, at least a portion of the first service information can be included in the first request, such as device capabilities. In one or more embodiments, the first request includes the first root ID and the network then obtains at least a portion of the first service information from stored network data according to the first root ID.

In one embodiment, the first user can conclude the metaverse service and later begin utilizing a second end user device 190B, which can be at a same location or even at a different location (e.g., including accessing the network 125 via a different access point or eNB). As described above, the first user can utilize the metaverse key 185A with the second end user device 190B to obtain a metaverse service which may be the same or a different metaverse service as was being presented by the first end user device 190A to the first user. Continuing with this example, the first end user device 190A can become available for use by other users, which can include receiving second input that indicates a second root ID of a second user (i.e., metaverse key 185B). This can result in the first end user device 190A providing a second request to the network server 180 (or other functionality including virtual machine(s)), where the second request provides or is utilized to obtain second service information associated with second service parameters corresponding to the second user according to the second root ID. Second immersive media can then be received and presented by the first end user device 190A for the second user, where the second immersive media is provided over the network utilizing at least one of a second network slice(s), a second spectrum resource allocation(s), and/or a second RAT(s) that is selected (e.g., by the network server 180) according to the second service parameters.

In one embodiment, the first end user device can be shared amongst users, such that the second input is received during the presenting the first immersive media to the first user, where the presenting the first and second immersive media results in an aggregated immersive media. In this example, the first end user device can include a user interface with a display that is accessible to the first and second users, where the aggregated immersive media is presented via the user interface. For instance, the first end user device can be a 3D display and the aggregated immersive media can be a combination of content that is customized to both users that are observing the display according to their respective root IDs.

In one embodiment, the communication service can be concluded or ended according to an expiration of a time limit, such as where the use of the first end user device 190A is only permitted for a certain amount of time that is paid for by the user. In this example, one or more of the end user devices can be owned by a third party and made available to the users, such as at café, laser tag venue, and so forth. In one embodiment, the first service information defines requirements for latency and throughput. In one embodiment, the first service information includes one or more of an identification of first user capabilities, an identification of first content, one or more network parameters associated with at least one of the first user capabilities or the first content, one or more QoS parameters associated with at least one of the first user capabilities or the first content, an identification of one or more applications for presenting at least one of the first user capabilities or the first content, or any combination thereof.

In one embodiment, the first immersive media is part of an XR service, where the first end user device 190A is a wearable device, and where it can communicate (e.g., peer-to-peer) with a second wearable device of the first user to facilitate the second wearable device presenting a portion of the XR service, such as goggles and gloves. In one embodiment, communication between the first end user device 190A and a second wearable device includes providing information that enables synchronizing the first immersive media with stimuli provided by the second wearable device. In one embodiment, the first immersive media can be part of an XR service, where the first end user device 190A is a first wearable device and can communicate (e.g., peer-to-peer) with a second wearable device of another user to facilitate the second wearable device presenting a portion of an XR world associated with the XR service via the second wearable device to the other user.

In one embodiment, the first immersive media is one of virtual reality or augmented reality, and the network server (or other functionality including virtual machine(s)) can apply a machine learning model to determine first service parameters or to select at least one of the first network slice, the first spectrum resource allocation, and the first RAT according to first service parameters.

In one or more embodiments, system 100 enables seamless transition between different user modes, such as from work mode to entertainment mode to online learning mode, and so on. The seamless transition(s) can be performed between and through use of multi-modal metaverse profiles without frequent swapping of gears or skip loading the metaverse applications or software. As an example, server 180 or other device or functionality (including virtual machine(s)) can manage one or more metaverse profiles for providing immersive media or a portion thereof (e.g., a metaverse world) to one or more users, such as via device(s) 190. In one or more embodiments, devices 190 can be various types of devices or end user devices including a headset (e.g., AR or VR), a smartphone, a tablet, a laptop, wearable electronics, a projector, a hologram machine (e.g., 3D immersive media), or other computing device that facilitates a user(s) experiencing immersive media.

In one or more embodiments, the server 180 can execute or otherwise operate a metaverse platform for providing immersive media (or a portion thereof) to the end user device 190 which can be accessible over a communications network (e.g., network 125). In other embodiments, all or a portion of the immersive media can be provided by other device(s), including equipment of third parties that are distinct from an operator of the network 125. For example, the metaverse platform can be a centralized platform (e.g., executed by a third party server (or in the cloud), executed by a network server (or in the cloud) or executed by the end user device) or can be a distributed platform, which may use one or more devices from the network provider, third party providers, or the end user device/customer premises equipment as resources for performing functionality of the metaverse platform.

As another example, the immersive media (e.g., a metaverse world) can be a collaboration amongst different providers which can include one or more content providers 175 (which may or may not include content from the network provider). In one embodiment, metaverse profile(s) (which can be associated with the user) can include various information that facilitates providing immersive media to the user, such as information customized to particular user capabilities and/or content to be provided or otherwise allowed in the immersive media. As an example, the information of the metaverse profile can include an identification or description of user capabilities, an identification or description of content, one or more network parameters associated with presenting or enabling the user capabilities and/or the content, one or more QoS parameters or requirements (e.g., latency, throughput, and so forth) associated with presenting or enabling the user capabilities and/or the content, an identification of one or more applications for presenting or enabling the user capabilities and/or the content, or any combination thereof. In one or more embodiments, the metaverse profiles can be a collection of data defining, associated with or including content and/or user capabilities, where the information can be stored together or separately for each of the profiles.

In one embodiment, the metaverse profile can include network orchestration information, network slicing information (e.g., Single Network Slice Selection Assistance Information (S-NSSAI)), spectrum resource allocation information, frequency band(s), channels, RAT information, or other information that recommends or instructs as to how the communication session for the immersive media is to be provided or delivered to the end user devices 190. In another embodiment, the metaverse profile can include information corresponding to the user capabilities and/or content that allows the network equipment (e.g., server 180) to derive or otherwise determine network orchestration information, network slicing information (e.g., S-NSSAI), spectrum resource allocation information, frequency band(s), channels, RAT information, or other information that is to be used in establishing or facilitating the communication session for the immersive media to be provided or delivered to the end user devices 190.

In one embodiment, the metaverse profile can include information that is selected or determined based on providing a particular user mode when the end user device 190 is engaged in the immersive experience, such as a work mode, an entertainment mode, a learning mode, and so forth.

In one embodiment, events in or associated with the immersive media, such as user actions and/or user interactions, can be monitored (e.g., by the server 180) to detect a triggering event, and the selection and initiation of at least one of a different network slice(s), different spectrum resource allocation(s), or different RAT(s) can be prior to the detecting of the triggering event.

In one embodiment, a machine learning model can be applied (e.g., by the server 180) to user actions and user interactions of the user with the immersive media (or other information associated with providing the immersive media including network conditions, time of day, number of users, activities of other users, and so forth) to detect a transition event and/or a triggering event for selecting, initiating and/or transitioning to a different metaverse profile. The machine learning model can be various types including supervised, unsupervised, federated, and so forth. The machine learning model can be trained on various data, including historical user actions and user interactions of the particular user with the immersive media or with other immersive media types, historical user actions and user interactions of other users (e.g., determined to have similar characteristics, habits or traits as the user) with the immersive media or with other immersive media types.

As an example, system 100 can facilitate in whole or in part receiving a first request for a first communication service from a first end user device operated by a first user, where the first request provides or is used to obtain first service information associated with first service parameters corresponding to the first user according to a first root ID provided to the first end user device by the first user; providing, over a network, first immersive media for presentation by the first end user device in response to the first request, where the first immersive media is provided utilizing the first network slice, the first spectrum resource allocation, and the first RAT that are selected according to the first service parameters; receiving a second request for a second communication service from a second end user device operated by the first user, where the second request provides or is used to obtain the first service information; and providing, over the network, second immersive media for presentation by the second end user device in response to the second request, where the second immersive media is provided utilizing the second network slice, the second spectrum resource allocation, and the second RAT that are selected according to the first service parameters. In one embodiment, communication between the first and second end user devices can be facilitated to synchronize the immersive media with stimuli provided via the second end user device.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200 functioning within the communication network of FIG. 1 in accordance with various aspects described herein. System 200 can accommodate metaverse devices 190, including the introduction of new devices as they are developed. In one embodiment, an open platform, open software stacks, and/or open interfaces can be utilized which are accessible to users and which may be owned by the users and/or by others, rather than proprietary metaverse devices. In one embodiment, an open platform and open interface is provided which can enable an open ecosystem for software defined metaverse device transformation. The scalability of the ecosystem can lower cost.

In one embodiment, metaverse devices 190 can utilize generic commercial off the shelf (COTS) hardware chips. In one embodiment, metaverse devices 190 can execute software for different applications and/or services. For example, goggles can focus on image processing, while gloves focus on touch sensing, and so forth. Metaverse devices 190 can have open interfaces for new personalized software service additions, such as enhanced imaging, temperature sensing, and so forth.

In one embodiment, a user can use a metaverse key or ID (e.g., a root ID) 185 to activate/de-activate the metaverse services through use of metaverse devices 190 (which may or may not be owned by the users). As an example, each user can have a unique root ID (or a group of root IDs such as each one being directed to a different service mode of the particular user such as work, entertainment, gaming, learning, etc.).

In one embodiment, the metaverse devices 190 (whether operated by a same user or different users) can also form a mesh network to communicate among different metaverse devices (e.g., peer-to-peer techniques) such as in an AR or VR world. For example, goggle and glove devices can wirelessly communicate with each other and provide a richer experience to a single user. As another example, goggles of one user can communicate with goggles of another user to facilitate synchronization and coordination of an AR or VR worlds in which both users are simultaneously operating.

In one embodiment, the metaverse keys 185 can be shared with family or friends, and/or can be rented or otherwise temporarily obtained for use, such as paying (or renting out) to utilize a metaverse key for a specific time, which can lower costs for users.

In one embodiment, service information associated with service parameters corresponding to the first user can be obtained or derived according to the root ID. As an example, the user can provide the first end user device with a root ID that can be utilized to determine or derive the service information and/or the service parameters, where the root ID can be provided by the user in a number of different ways including as a user input (e.g., a unique identifier provided via text or voice by the first user), a biometric identifier obtained from the first user (e.g., a fingerprint, voice recognition, image recognition, and so forth), and/or or data provided upon insertion of an insertable hardware key compatible with the device, such as into a port of the end user device. In one embodiment, the service information can be one or more of an identification of user capabilities, an identification of content, one or more network parameters associated with at least one of the user capabilities or the content, one or more QoS parameters associated with at least one of the user capabilities or the content, an identification of one or more applications for presenting at least one of the user capabilities or the content, latency requirements, throughput requirements, or any combination thereof which is obtained according to the root ID.

The obtaining of the service information can be done in a number of different ways, such as where the service request includes the root ID and the providing the root ID to the network causes the network to access service data 285 (e.g., metaverse profiles) stored in the network that corresponds to that root ID. In other embodiments, the request can include service information (or a portion thereof) that is derived by the end user device from the root ID, such as the end user device identifying service parameters according to an inputted root ID, capabilities of the end user device, type of service being requested, and so forth.

In one embodiment on the network side, a RAN can operate as a transformer to provide dynamic and flexible configurations for the user according to the root ID. For instance, based on the root ID provided by the metaverse device (e.g., in a service request), the RAN can dynamically schedule the resources to differentiate and optimize the services. In one embodiment, if the metaverse service expects or requests low latency (e.g., below a threshold), the RAN can prioritize the latency for the end user device that is operating according to this root ID. In one embodiment, if the metaverse service expects or requests higher speed (e.g., above a threshold), the RAN can prioritize the speed for the end user device that is operating according to this root ID.

In one embodiment, when a user moves in the physical world (e.g., indoor, outdoor, highway, dense urban, rural), the network speed/latency varies and the system can dynamically adjust the resource allocation, and/or upgrade/downgrade the metaverse services accordingly. For example, when a user moves from indoor to outdoor, the network speed goes down, and the system can suggest to the end user device utilizing the particular root ID that real-time gaming participation experience will be degraded, whereby the end user device utilizing the particular root ID may choose to switch to watch mode, instead of participation mode.

In one embodiment, with the flexibility from both the software-defined metaverse device and metaverse-aware RAN scheduling, the metaverse service can also be transformed to enable users to selectively activate dramatically different services from the network based on a software configuration, which can depend on various factors including user expectation, meta context/environment/surrounding, user physical location, time of the day, and so forth. In one embodiment, users can be provided with a smooth transition among different metaverse services.

In one embodiment, a first end user device 190A (e.g., goggles) can: receive an input that indicates a first root ID 185A of a user; provide a request to a network server for a communication service (e.g., which can include the root ID or other information from which the network can obtain or generate a particular network configuration for the root ID); receive immersive media for presentation in response to the request, where the immersive media is provided over the network 250 utilizing a network slice(s), a spectrum resource allocation(s), and a RAT(s) that are selected according to service parameters associated with the user according to the root ID; and present the immersive media, such as part of an XR service. In this example, the user can also utilize another end user device(s) (e.g., gloves 195A) in conjunction with the root ID 185A (which can similarly obtain a network configuration according to the root ID) to obtain a fuller metaverse experience. In one embodiment, the end user devices 190A, 195A of the same user can communicate with each other (e.g., peer-to-peer protocols) to facilitate synchronizing their presentations, including presenting the immersive media with stimuli provided via the second end user device 190B.

In one embodiment, the end user device 190A can communicate with an end user device 190B (e.g., peer-to-peer protocols) to facilitate synchronizing their presentations, such as in a same XR world. For example, the end user device 190B can obtain a network configuration as described herein according to the root ID 185B of the other user. In one embodiment, the root IDs 185A, B can be utilized to obtain service parameters for their respective users from mapped or indexed stored data 285A, B (e.g., metaverse profiles).

In one or more embodiments, system 200 provides a needs-aware connection between a user and metaverse profiles, which can enable dynamic adjusting of the metaverse experience in an automated technique. In one or more embodiments, system 200 provides metaverse profile creation via leveraging network slicing technology, spectrum allocation, and/or radio technologies.

As an example, a user can be using AR glasses 190A for remote learning via a WiFi connection, but desires to switch to cloud gaming. In this example, the AR glasses 190A could utilize a direct cellular connection to prepare a gaming metaverse profile 285A (e.g., associated with the user or a default gaming profile) without impacting the remote learning. In another example, the gaming metaverse profile can be loaded via a different WiFi channel (e.g., remote learning on 5 GHz channel while preparing gaming on 6 GHz channel). In another example, a different network slice can be employed for the transition, such as remote learning on slice A while preparing gaming on slice B.

In one or more embodiments, system 200 enables dynamically switching metaverse profiles based on various triggering events, such as a user's instruction (e.g., voice, eyeball movement, facial cue, gesture, etc.). In this example, the metaverse profile can be automatically switched, whereby system 200 is preparing the target metaverse profile ahead of time to reduce any transition delay. In one or more embodiments, system 200 can apply machine learning to train an AI agent to facilitate or assist the automated transition. In one or more embodiments, system 200 can release the metaverse profile naturally. For example, the system 200 can automatically terminate the complete metaverse profile, release the network slice, unused RAT and/or network spectrum resource used by a previous metaverse profile (e.g., when the system determines a particular task is complete). In one or more embodiments, system 200 releases the metaverse profile naturally without interference to the physical world. In one or more embodiments, system 200 enables the user to retain control (e.g., with assistance from the system as needed) to terminate any profile that they do not desire or may not be comfortable with.

In one or more embodiments, system 200 allows grouping of the metaverse profiles to create a metaverse social personality as a service. For example, the system can create a group of metaverse profiles as a service for social purposes. In one embodiment, the group size can be adjustable so as to cater to the need of the virtual social activities.

In one or more embodiments, system 200 provides a software defined metaverse personality for a user(s) which can be a mix of virtual world and physical world characteristics, capabilities and content, and a mixture of work life and personal life. In one or more embodiments, system 200 enables converting a root ID device to a different profile in different metaverse profiles. As an example, a unique ID can correspond to a metaverse characteristic such as work in order to meet people virtually, which can enable a smooth and real time transition. In one or more embodiments, system 200 enables attaching to different metaverse profiles via different interfaces.

In one or more embodiments, system 200 enables metaverse personalities which can define policies to become active and inactive. In one or more embodiments, system 200 enables monitoring and making decisions based on physical locations, such as adapting a virtual experience based on determining a strong or poor wireless connection in the physical world. In one or more embodiments, system 200 enables autonomic principles for system management and orchestration in a metaverse world. In one or more embodiments, system 200 enables physical world root IDs controlling the selection(s) of virtual world profiles. In one or more embodiments, system 200 enables different network slices and/or physical spectrum segmentation to be utilized for different metaverse profiles, which can be pre-arranged prior to transitioning between profiles.

The profiles 285 can be stored at various locations and combinations of locations (e.g., centralized storage and/or distributed storage for each profile) including in the network, at server 180, at end user devices 190, and/or in content provider storage (not shown). As described herein, the profiles 285 can be generated or created in a number of different ways by various devices, and can include various information that facilitates the content provider presenting content and/or user interactions with the content such as network orchestration information, network slicing information (e.g., S-NSSAI), spectrum resource allocation information, frequency band(s), channels, RAT information, or other information that recommends or instructs as to how the content provider can contribute to or otherwise provide content for the immersive media that is to be provided or delivered to the end user device 190. In another embodiment, the metaverse profile (or other metaverse profiles described herein) can include information corresponding to the user capabilities and/or content that allows the network equipment (e.g., server 180) to derive, calculate, select, or otherwise determine network orchestration information, network slicing information (e.g., S-NSSAI), spectrum resource allocation information, frequency band(s), channels, RAT information, or other information that is to be used in providing content for the immersive media.

For example, a first profile 285A can facilitate a content provider presenting content and/or user interactions with the content for a first user mode such as where the user is doing e-commerce on behalf of a business (e.g., purchasing equipment, materials, office supplies, etc.). In this example, the user can be transitioned to a second user mode via a second profile 285B such as where the user is doing e-commerce for personal items (e.g., home supplies, groceries, etc.). The first and second profiles 285A, B can include different storefronts (operated or associated with a same or different entities), different items, different backgrounds, different purchasing tools/IDs/accounts, and so forth. For instance, the user can be purchasing office supplies for a business and then the system can detect that the user is viewing/searching sports clothing. This can trigger preparing or otherwise initiating the second profile 285B (which can include spinning up or facilitating use of a different network slice, a different spectrum resource allocation, and/or a different RAT based on the profile 285B) for presenting a new/adjusted storefront (which can include hinting or directing the user to move to the new storefront in a metaverse world) and thereafter presenting the new/adjusted storefront.

The metaverse platform can be a centralized platform (e.g., executed by a third party server (or in the cloud), executed by a network server (or in the cloud), executed by server 180, or executed by the end user device) or can be a distributed platform, which may use one or more devices from the network provider, third party providers, or the end user device/customer premises equipment as resources for performing functionality of the metaverse platform.

In one or more embodiments, users can have different modes with which to operate in the metaverse such as entertainment mode, family mode, friends mode, work mode, learning mode, relaxing mode, and so forth, which can be based on a user behaving differently when interacting in that mode with other users (such as family or friends). In one or more embodiments, users can see different environments from different metaverse profiles in a digital world and a virtual world. In one or more embodiments, users can switch or be switched between multi-mode metaverse profiles based on needs or desires, such as quickly transitioning from an online training mode to an entertainment mode or family-care mode.

In one or more embodiments, generating background (e.g., content shown in a virtual world) for profiles requires rendering a large amount of content, which can be performed (in whole or in part) ahead of time via processing of a network configuration and/or processing on a device-side, end to end. In one or more embodiments, a different mode provided through use of a different metaverse profile can be implemented without significant delay or any user experience interruption.

In one or more embodiments, content for the selected profile being delivered to the user can be provided in whole or in part by a third party, such as a content provider including content stored on their server and/or in the cloud. Continuing with this example, the telecommunication network service provider can provide an end-to-end network platform in order to meet requirements (e.g., latency threshold, throughput threshold, level of security/encryption, etc.) of different applications (e.g., associated with different user profiles). This network provider can provide orchestration and platform guidance on steering content, such as from particular server locations (e.g., selection of a particular content provider server that is co-located with the network equipment). In one or more embodiments, mobile edge computing can be implemented to facilitate content delivery for the metaverse profiles including selecting content provider servers that are within a proximity to an edge server. In one or more embodiments, each of the metaverse profiles of the user can include information associated with and/or defining user capabilities and content in the immersive media.

Figure 2B:
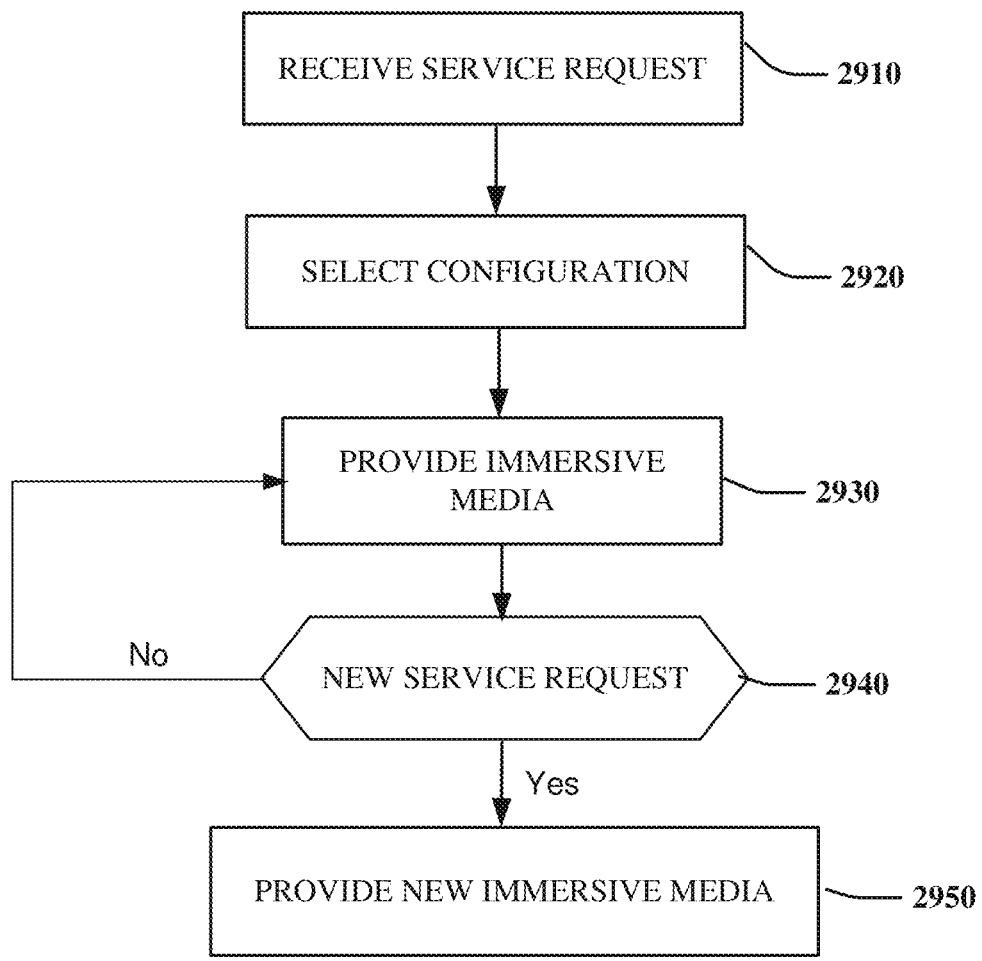
FIG. 2B depicts an illustrative embodiment of a method in accordance with various aspects described herein.

FIG. 2B depicts an illustrative embodiment of a method 290 in accordance with various aspects described herein. At 2910, a first request can be received by a network server (or other functionality that can manage or otherwise facilitate communication services including virtual machines, edge servers, and so forth). In one embodiment, the first request can be sent from a first end user device (e.g., a smart phone, a wearable device such as goggles, headset, vest, gloves, and so forth) for a first communication service. The first end user device can be in use by a first user, who may or may not own the first end user device. In one embodiment, the first request provides and/or can be utilized to obtain first service information associated with first service parameters corresponding to the first user. As an example, the first user can provide the first end user device with a first root ID that can be utilized to determine or derive the first service information and/or the first service parameters. The first root ID can be provided by the first user in a number of different ways including as a user input (e.g., a unique identifier provided via text or voice by the first user), a biometric identifier obtained from the first user (e.g., a fingerprint, voice recognition, image recognition, and so forth), and/or or data provided upon insertion of an insertable hardware key compatible with the device, such as into a port of the end user device. In one embodiment, the first service information can be one or more of an identification of user capabilities, an identification of content, one or more network parameters associated with at least one of the user capabilities or the content, one or more QoS parameters associated with at least one of the user capabilities or the content, an identification of one or more applications for presenting at least one of the user capabilities or the content, latency requirements, throughput requirements, or any combination thereof.

At 2920, the network server (or other functionality that can manage or otherwise facilitate communication services including virtual machines, edge servers, and so forth) can select (or generate) a first network slice(s), a first spectrum resource allocation(s), and a first RAT(s) according to the first service parameters. In one embodiment, AI/ML can be utilized to facilitate these selections and determinations, such as applying a machine learning model to the first service parameters and/or the particular service being sought to identify or predict which selections will provide the best or a better experience for the user, such as over the entirety of the service. In one embodiment, the machine learning model can be trained on various data including data associated with services provided to the particular user and/or to other users, data associated with providing similar services to the particular user or other users, network conditions, and so forth.

At 2930, first immersive media can be provided utilizing the first network slice, the first spectrum resource allocation, and the first RAT over a network to the first end user device for presentation by the first end user. As an example, the first immersive media can be an XR world (e.g., AR and/or VR world) where the first user is walking through it utilizing AR or VR goggles.

At 2940, monitoring can be performed to identify if a subsequent or second request has been received by the network server (or other functionality that can manage or otherwise facilitate communication services including virtual machines, edge servers, and so forth) and if it has, then immersive media can be provided at 2950 according to the second request. As an example, a second request can be received from a second end user device for a second communication service, where the second end user device is being utilized by the first user, and where the second request provides and/or is utilized to obtain the first service information associated with the first service parameters corresponding to the first user according to the first root ID provided to the second end user device by the first user. For instance, the first user can be at a venue where multiple types of wearable devices are available (e.g., rentable) and the first user may be switching from first goggles to second goggles, which may or may not have different capabilities. In one embodiment, a second network slice, a second spectrum resource allocation, and/or a second RAT can be selected according to the first service parameters, such as based on different capabilities of the second end user device as compared to the first end user device.

In one embodiment, the second communication service can be provided after the first communication service has ended, such as where the receiving the first request and the providing the first immersive media is via a first eNB of the network, and where the receiving the second request and the providing the second immersive media is via a second eNB of the network. As an example, the user may have travelled to another location but desired to engage in the AR or VR world from the new location (and from a new device, i.e., the second end user device).

In one embodiment, the second communication service is provided while the first communication service is being provided, such as where the receiving of the first and second requests and the providing of the first and second immersive media are via a same eNB of the network. In this example, the user may be adding the second end user device to enhance the experience, such as where the first end user device is goggles and the second end user device is gloves that allow for interaction in the immersive world and/or provide coordinated stimuli with actions occurring that are viewable via the goggles.

In one embodiment, the first and second end user devices are different types of wearable devices. In one embodiment, any number of end user devices and/or any type of end user devices can be utilized in the method 290.

In one embodiment, the method 290 can include receiving, by the network server (or other functionality that can manage or otherwise facilitate communication services including virtual machines, edge servers, and so forth) after a conclusion of the first communication service of the first user, a third request from the first end user device for a third communication service, where the first end user device is being utilized by a second user, where the third request provides and/or can be used to obtain second service information associated with second service parameters corresponding to the second user according to a second root ID provided to the first end user device by the second user. In this example, the first end user device can be utilized by different users who can customize the use based on the root ID that they input into the first end user device. In this example, the method 290 can include selecting, by the network server (or other functionality that can manage or otherwise facilitate communication services including virtual machines, edge servers, and so forth), a third network slice, a third spectrum resource allocation, and a third RAT according to the second service parameters; and providing, over the network, third immersive media for presentation by the first end user device in response to the third request, where the third immersive media is provided utilizing the third network slice, the third spectrum resource allocation, and the third RAT.

In one embodiment, the first immersive media is part of an XR service, where the first end user device is a first wearable device, and the method 290 can further include communicating with a second wearable device of a second user to facilitate the second wearable device presenting a portion of an XR world associated with the XR service via the second wearable device to the second user. As an example, the inter-device communication can be Bluetooth, WiFi or other shorter-range communications, which can include peer-to-peer communications, and which facilitates synchronizing presentations between the two devices, such as where the users are interacting in the same VR or AR world. In one embodiment, the first and second immersive media are part of an XR service, where the first and second end user devices are wearable devices, and where the first and second end user device communicate to enable synchronizing the first immersive media with stimuli.

In one embodiment, the end user devices can be any type of device including wearable and non-wearable, such as a smartphone, a tablet, a PC, a smart watch, goggles, gloves, vests, shoes, socks, and so forth.

In one embodiment, the system and method can separate, in whole or in part, the software and the hardware for providing a metaverse experience. In one embodiment, the system and method can convert general purpose end user devices to metaverse devices customized to the user according to the user's root ID.

In one embodiment, the system and method allows users to access a metaverse service by only possessing a metaverse key, which can be a physical device such as a key fob or can be a unique ID such as a root ID, that is usable with an end user device.

In one embodiment, the system and method enables the RAN to perform scheduling and optimization according to a particular metaverse user(s). In one embodiment, the system and method, the root ID when input into an end user device can result in particular settings being applied by the network to the end user device and the particular service being provided or requested, where the setting can also include particular network slices, resource allocations, RATs, and so forth.

In one embodiment, the system and method can provide for group services, such as a metaverse concert where each individual device is provided with a network configuration based on a listen mode for each user and, on the network side, resources can be optimized to deliver a concert content to a large number of users.

In one embodiment, the system and method can provide a higher level of security in communications according to a particular root ID. In one embodiment, the system and method can provide goggles with network resources that are more efficient in providing enhanced imaging, while providing gloves with network resources that are more efficient in providing temperature sensing and stimuli.

In one embodiment, the system and method can provide a mesh network of metaverse devices (e.g., where each user inputs a respective root ID to activate a particular one of the metaverse devices) that can share network resources, such as designating one or more network slices for delivering an AR or VR world to a group of users interacting in the AR or VR world together.

In one embodiment, the system and method can provide increased efficiency in the mesh network by distributing functions to other devices or by using peer-to-peer communications, such as delivering content to a first group of end user devices which then deliver the content to other end user devices in peer-to-peer communications. In one embodiment, the system and method can selectively determine devices that will utilize uplink and/or downlink communications with the network and/or content providers, and will utilize peer-to-peer communications between the devices to facilitate distributing uplink and downlink amongst all of the devices.

In one embodiment, the system and method can provide for authentication of end user device requests and root IDs by network elements, such as the server 180. In one embodiment, the system and method can provide for workload distribution among the end user devices, as well as distribution between the network side and the device side, such as network elements or the RAN performing certain functions while end user devices perform other functions, whereby the distribution is determined dynamically according to various factors including network conditions, end user device capabilities, end user device battery life, and so forth.

In one embodiment, the system and method can provide predetermined network configurations based on an authentication of a root ID input into a metaverse device. In one embodiment, the system and method can dynamically provide network configurations (e.g., according to network conditions, device capabilities, service types, QoS requirements, etc.) based on an authentication of a root ID input into a metaverse device.

In one embodiment, the system and method can provide the device can operate according to a pre-defined personality based on the root ID, and can obtain an immediate allocation of some resources to initiate the metaverse service. In this example, the network can further evaluate the overall resource pool to determine whether the metaverse service and its QoS requirements can be accommodated. If the network determines that the QoS requirements cannot be satisfied then the network can instruct the end user device to either lower down the QoS requirements or delay initiating the metaverse service until necessary resources are available.

In this example, the network can initially provide a default mode for the requested metaverse service and then can attempt to optimize the service according to QoS parameters corresponding to the root ID. In one embodiment, the system and method can provide notifications or recommendations to the end user devices according to network changes that are predicted to occur at a future time, such as notifying an end user device that it should either lower down the QoS requirements (or adjust the service such as going from active gaming to a viewing mode) or cease providing the metaverse service at 6 pm because that time is predicted to cross a threshold for network conditions and certain resources will no longer be available. In one embodiment, the system and method can provide notifications to the end user devices (and users) that QoS experience will be impacted at a future time due to a predicted network change.

In one embodiment, the system and method can provide recommendations to the end user devices according to network changes that are predicted to occur that are location-based, such as recommending travelling to a different location where an AR world will have better resources because the network conditions are better or are predicted to be better.

In one embodiment, the system and method can provide dynamic adjustments to the metaverse service according to observed network conditions and/or predicted network conditions such as determining that RAN resources will fall below a particular threshold at 6 pm and providing a recommendation or instruction to switch from high definition videos to standard definition videos at that time. In this example, the metaverse service can switch back automatically when the resources become available.

In one or more embodiments, a single or multiple metaverse profiles (e.g., applied/employed in series and/or applied/employed in parallel) can be utilized to provide a metaverse or other digital experience. In one or more embodiments, the single or multiple metaverse profiles (e.g., applied/employed in series and/or applied/employed in parallel) can be applicable to other digital environments, immersive experiences, media, and so forth, whether persistent or temporary (including constructed and torn down by the user(s)).

In one or more embodiments, creating, switching, and/or terminating one or more metaverse profiles to manage or otherwise facilitate providing immersive media (e.g., a persistent or temporary metaverse world or other interactive communication services) can be provided to a user(s). In one or more embodiments, the methods and systems can dynamically prepare a new (target) metaverse profile(s) in advance or otherwise prior to a particular event or time period through network slicing. In one or more embodiments, the methods and systems can dynamically prepare a new (target) metaverse profile(s) in advance or otherwise prior to a particular event or time period through network spectrum resource allocation. In one or more embodiments, the methods and systems can dynamically prepare a new (target) metaverse profile(s) in advance or otherwise prior to a particular event or time period through a separate or different network radio technology.

In one or more embodiments, the methods and systems can provide real-time switching of the metaverse profile(s) based on various factors, including user(s)'s needs or expectations. In one or more embodiments, the methods and systems can provide switching of the metaverse profile(s) triggered by a user(s)'s instructions (e.g., voice, facial cue, eyeball movement, gesture, etc.) or according to monitored/detected behavior of the user (or of other users in the immersive experience), such as a machine learning model being applied to a specific user(s)'s habits or behavior. In one or more embodiments, the methods and systems can manage the metaverse profile(s) so as to build a metaverse responsibly, such as releasing a metaverse profile(s) naturally. In one embodiment, autonomic principles can be employed for system management and orchestration in order to give the user(s) the option to have physical world root ID controls over the virtual world profiles.

In one embodiment, the methods and systems can provide or create a feedback loop or mechanism to analyze the metaverse profile(s) and/or the immersive experience of the user(s), such as determining that a particular metaverse profile caused a user to feel uncomfortable, which can be utilized in the future for the user to improve the creation, switching, and/or termination of particular metaverse profiles.

In one embodiment, the methods and systems can provide for grouping of metaverse profiles for a single user or for a group of users which can then be utilized to create a metaverse social personality as a service. As an example, multiple metaverse profiles can be selected for a communication session of a particular user and those profiles can be aggregated or merged to generate another metaverse profile, which can be used to provide at least some of the user capabilities and/or content associated with the multiple metaverse profiles during the session. In one embodiment, this new or aggregated metaverse profile can be stored for future use by the user (or other users).

In one embodiment, the methods and systems can be scaled up or otherwise adjusted, particularly as metaverse technologies mature or improve including in a mixed physical and virtual world. In one embodiment, the methods and systems can provide a smooth or seamless transition between different multi-modal metaverse profiles (e.g., personalities), which can be based on various factors such as real-time identification of needs or desires. In one embodiment, a transition between one or more of a work mode, an entertainment mode, an online learning mode, or other user modes can be implemented through a smooth/seamless/fast transition amongst multi-modal metaverse profiles without frequent swapping the gears or skip loading the metaverse applications or software, which will greatly improve the metaverse or immersive media user experience.

In one or more embodiments, metaverse profiles 285 can be prepared based on various information (including user characteristics, historical behavior, user requests, user location in a metaverse world and so forth), and various techniques (including machine learning). The preparation can include selection and initiation of network slicing, spectrum resource allocation, and/or RAT.

In one embodiment, the system and method can prepare target metaverse profile(s) while the user continues the immersive experience utilizing an original metaverse profile.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 290 presented in FIGS. 1, 2A, 2B, and 3. For example, virtualized communication network 300 can facilitate in whole or in part receiving a first request for a first communication service from a first end user device operated by a first user, where the first request provides or can be utilized to obtain first service information associated with first service parameters corresponding to the first user according to a first root ID provided to the first end user device by the first user; providing, over a network, first immersive media for presentation by the first end user device in response to the first request, where the first immersive media is provided utilizing the first network slice, the first spectrum resource allocation, and the first RAT that are selected according to the first service parameters; receiving a second request for a second communication service from a second end user device operated by the first user, where the second request provides or can be utilized to obtain the first service information; and providing, over the network, second immersive media for presentation by the second end user device in response to the second request, where the second immersive media is provided utilizing the second network slice, the second spectrum resource allocation, and the second RAT that are selected according to the first service parameters. In one embodiment, communication between the first and second end user devices can be facilitated to synchronize the immersive media with stimuli provided via the second end user device.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
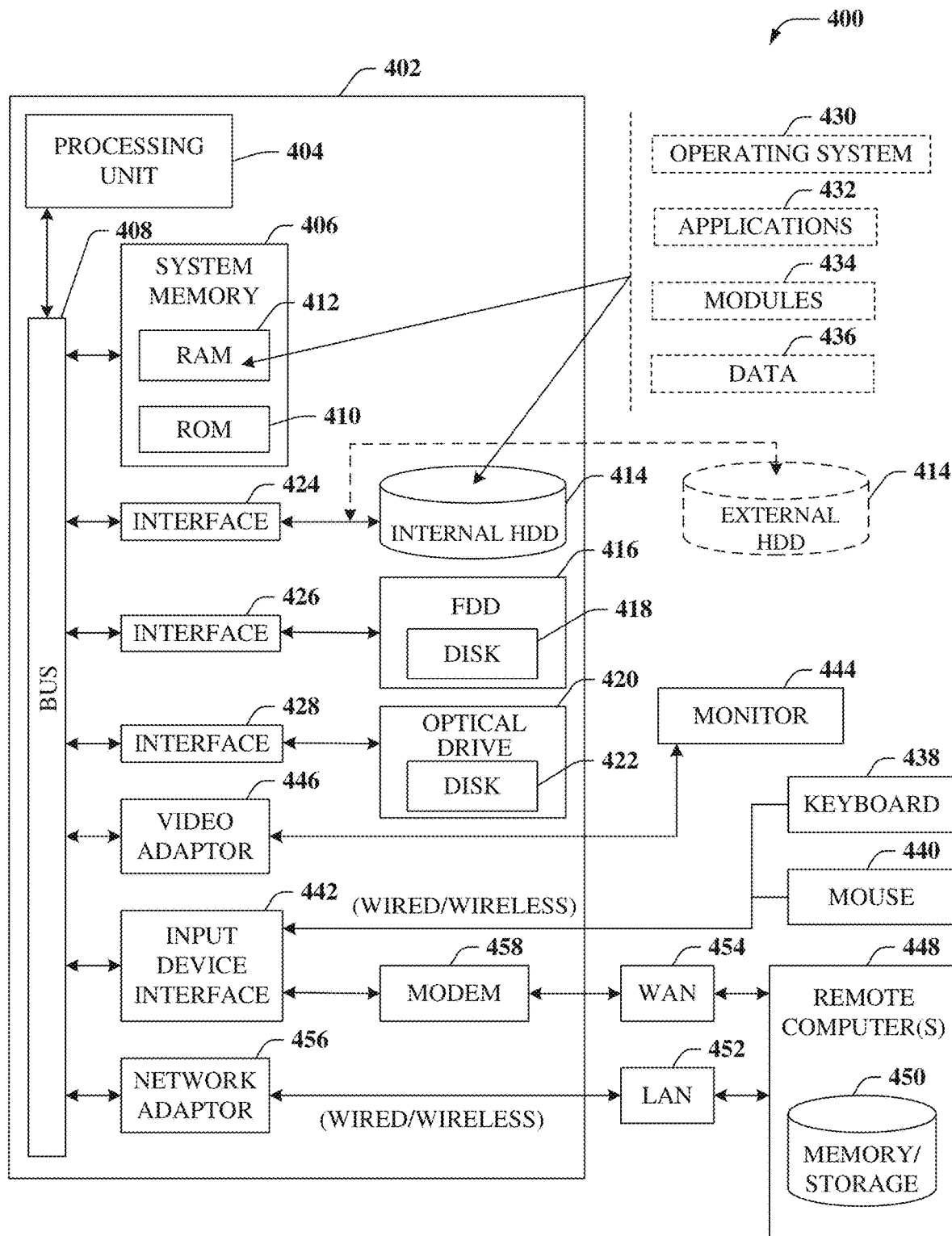
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software.

For example, computing environment 400 can facilitate in whole or in part receiving a first request for a first communication service from a first end user device operated by a first user, where the first request provides or can be utilized to obtain first service information associated with first service parameters corresponding to the first user according to a first root ID provided to the first end user device by the first user; providing, over a network, first immersive media for presentation by the first end user device in response to the first request, where the first immersive media is provided utilizing the first network slice, the first spectrum resource allocation, and the first RAT that are selected according to the first service parameters; receiving a second request for a second communication service from a second end user device operated by the first user, where the second request provides or can be utilized to obtain the first service information; and providing, over the network, second immersive media for presentation by the second end user device in response to the second request, where the second immersive media is provided utilizing the second network slice, the second spectrum resource allocation, and the second RAT that are selected according to the first service parameters. In one embodiment, communication between the first and second end user devices can be facilitated to synchronize the immersive media with stimuli provided via the second end user device.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
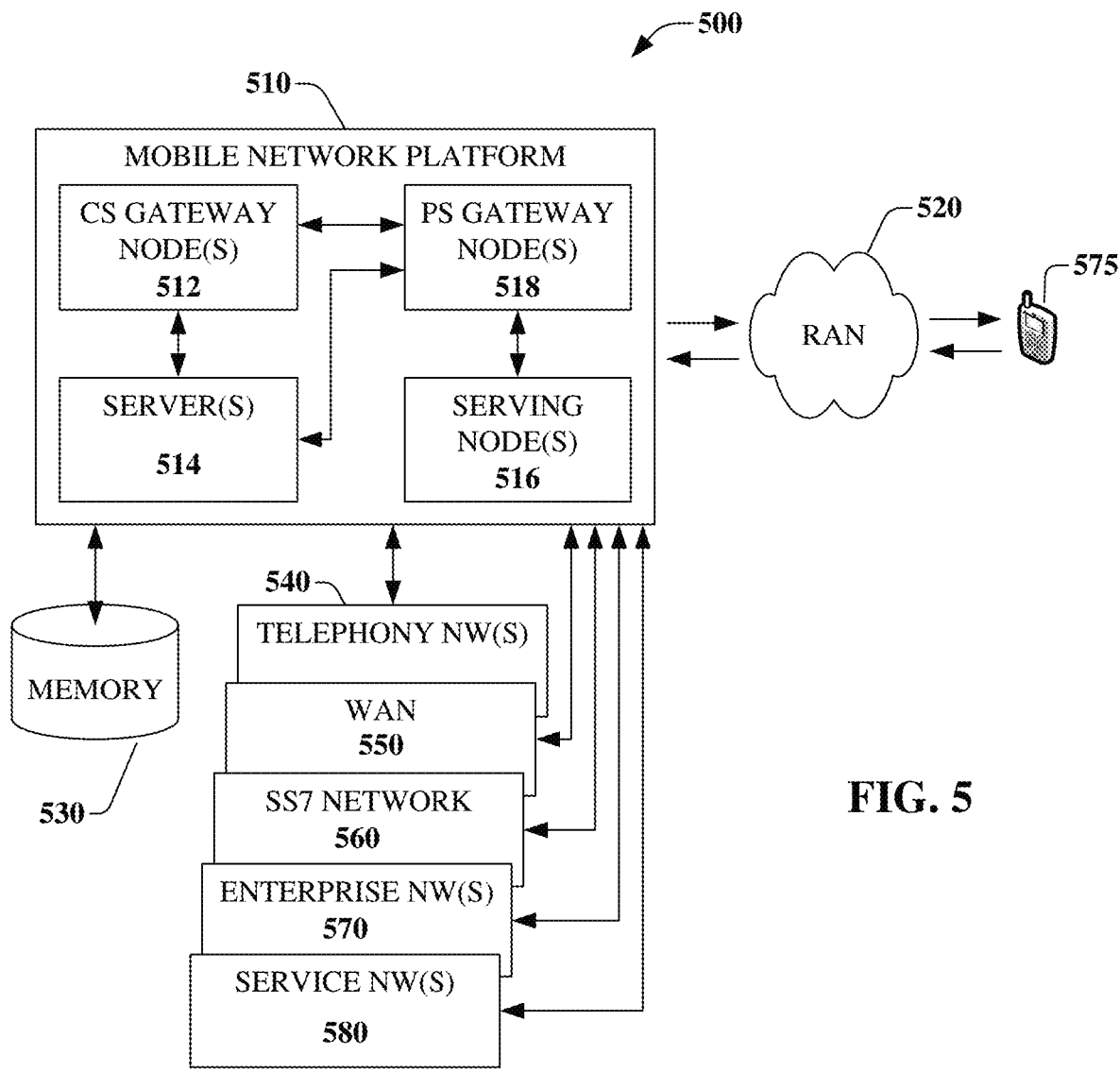
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving a first request for a first communication service from a first end user device operated by a first user, where the first request provides or can be utilized to obtain first service information associated with first service parameters corresponding to the first user according to a first root ID provided to the first end user device by the first user; providing, over a network, first immersive media for presentation by the first end user device in response to the first request, where the first immersive media is provided utilizing the first network slice, the first spectrum resource allocation, and the first RAT that are selected according to the first service parameters; receiving a second request for a second communication service from a second end user device operated by the first user, where the second request provides or can be utilized to obtain the first service information; and providing, over the network, second immersive media for presentation by the second end user device in response to the second request, where the second immersive media is provided utilizing the second network slice, the second spectrum resource allocation, and the second RAT that are selected according to the first service parameters. In one embodiment, communication between the first and second end user devices can be facilitated to synchronize the immersive media with stimuli provided via the second end user device.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
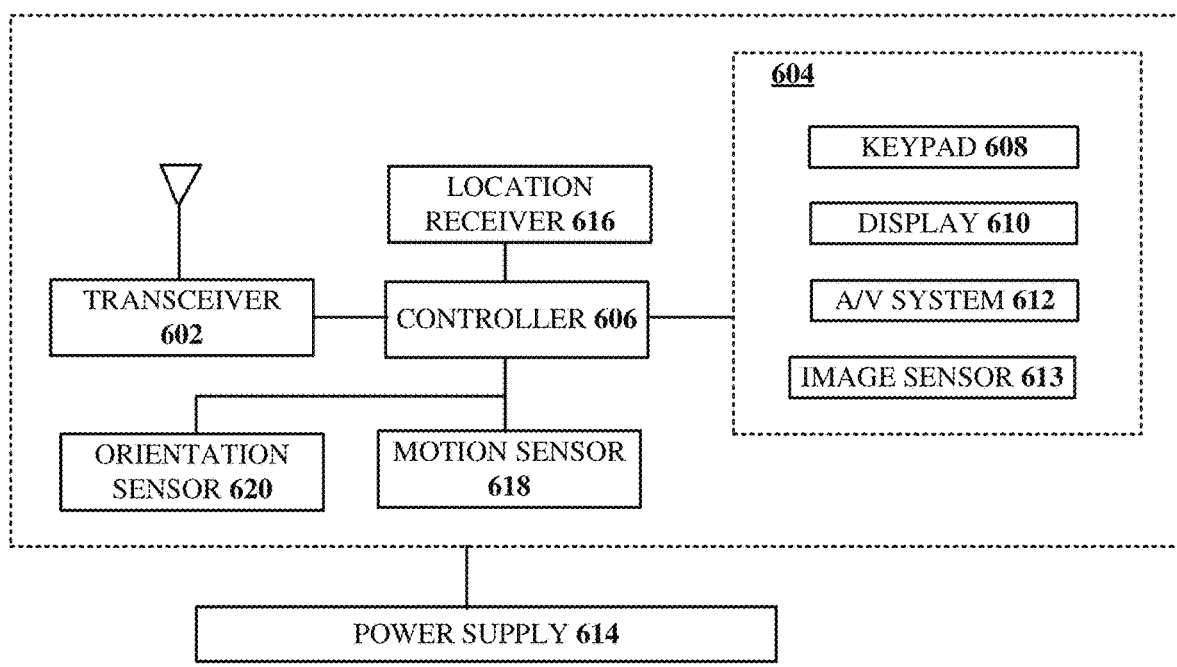
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving a first request for a first communication service from a first end user device operated by a first user, where the first request provides or can be utilized to obtain first service information associated with first service parameters corresponding to the first user according to a first root ID provided to the first end user device by the first user; providing, over a network, first immersive media for presentation by the first end user device in response to the first request, where the first immersive media is provided utilizing the first network slice, the first spectrum resource allocation, and the first RAT that are selected according to the first service parameters; receiving a second request for a second communication service from a second end user device operated by the first user, where the second request provides or can be utilized to obtain the first service information; and providing, over the network, second immersive media for presentation by the second end user device in response to the second request, where the second immersive media is provided utilizing the second network slice, the second spectrum resource allocation, and the second RAT that are selected according to the first service parameters. In one embodiment, communication between the first and second end user devices can be facilitated to synchronize the immersive media with stimuli provided via the second end user device.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving first input that indicates a first root ID of a first user;
providing a first request to a network server for a first communication service;
receiving first immersive media for presentation in response to the first request, wherein the first immersive media is provided over a network utilizing a first network slice, a first spectrum resource allocation, and a first Radio Access Technology (RAT) that is selected according to first service information corresponding to the first root ID, wherein the first immersive media is part of an extended reality (XR) service, and wherein the device is a first wearable device;
presenting the first immersive media;
receiving second input that indicates a second root ID of a second user;
providing a second request to the network server;
receiving second immersive media for presentation in response to the second request, wherein the second immersive media is provided over the network utilizing at least one of a second network slice, a second spectrum resource allocation, or a second RAT that is selected according to second service information corresponding to the second root ID;
presenting the second immersive media; and
communicating with a second wearable device of the first user to facilitate the second wearable device to present a portion of the XR service, wherein the communicating with the second wearable device includes providing information that enables synchronizing the first immersive media with stimuli provided by the second wearable device.

2. The device of claim 1, wherein the receiving the second input occurs after a conclusion of the presenting the first immersive media to the first user, and wherein the providing the second request to the network server is for a second communication service for the second user.

3. The device of claim 1, wherein the first request provides at least a portion of the first service information associated with first service parameters corresponding to the first user according to the first root ID, wherein the second request provides at least a portion of the second service information associated with second service parameters corresponding to the second user according to the second root ID, wherein the first input is one of a unique identifier provided via text or voice by the first user, a biometric identifier obtained from the first user, or data provided upon insertion of an insertable hardware key compatible with the device, wherein the second input is one of a unique identifier provided via text or voice by the second user, a biometric identifier obtained from the second user, or data provided upon insertion of an insertable hardware key compatible with the device.

4. The device of claim 1, wherein the receiving the second input occurs during the presenting the first immersive media to the first user, wherein the presenting the first and second immersive media results in an aggregated immersive media, and further comprising:
a user interface including a display that is accessible to the first and second users, wherein the aggregated immersive media is presented via the user interface.

5. The device of claim 1, wherein the first communication service is ended according to an expiration of a time limit.

6. The device of claim 1, wherein the first service information defines requirements for latency and throughput.

7. The device of claim 1, wherein the first service information comprises an identification of first user capabilities, an identification of first content, one or more network parameters associated with at least one of the first user capabilities or the first content, one or more QoS parameters associated with at least one of the first user capabilities or the first content, an identification of one or more applications for presenting at least one of the first user capabilities or the first content, or any combination thereof.

8. The device of claim 1, wherein the receiving of the first immersive media is via a first eNodeB (eNB) of the network, and wherein the receiving of the second immersive media is via a second eNB of the network.

9. The device of claim 1, wherein the providing of the first request is via a first eNodeB (eNB) of the network, and wherein the providing of the second request is via a second eNB of the network.

10. The device of claim 1, wherein the device comprises an XR headset, and wherein the second wearable device comprises XR gloves.

11. The device of claim 1, wherein the operations comprise:
communicating with a third wearable device of a third user to facilitate the third wearable device presenting a portion of an XR world associated with the XR service via the third wearable device to the third user.

12. The device of claim 1, wherein the first immersive media is one of virtual reality or augmented reality, and wherein the operations further comprise one of:
applying a machine learning model to select at least one of the first network slice, the first spectrum resource allocation, or the first RAT.

13. A method, comprising:
receiving, by a processing system including a processor of a network server, a first request from a first end user device for a first communication service, wherein the first end user device is being utilized by a first user;
selecting, by the network server, a first network slice, a first spectrum resource allocation, and a first Radio Access Technology (RAT) according to first service information corresponding to a first root ID provided to the first end user device by the first user;
providing, over a network, first immersive media for presentation by the first end user device in response to the first request, wherein the first immersive media is provided utilizing the first network slice, the first spectrum resource allocation, and the first RAT;

receiving, by the network server, a second request from a second end user device for a second communication service, wherein the second end user device is being utilized by the first user;
selecting, by the network server, a second network slice, a second spectrum resource allocation, and a second RAT according to the first service information corresponding to the first root ID provided to the second end user device by the first user; and
providing, over the network, second immersive media for presentation by the second end user device in response to the second request, wherein the second immersive media is provided utilizing the second network slice, the second spectrum resource allocation, and the second RAT, wherein the first and second immersive media are part of an extended reality (XR) service, wherein the first and second end user devices are wearable devices, wherein the first and second end user devices communicate to enable synchronizing the first immersive media with stimuli.

14. The method of claim 13, wherein the second communication service is provided after the first communication service has ended, wherein the receiving the first request and the providing the first immersive media is via a first eNodeB (eNB) of the network, and wherein the receiving the second request and the providing the second immersive media is via a second eNB of the network.

15. The method of claim 13, wherein the second communication service is provided while the first communication service is being provided, wherein the receiving of the first and second requests and the providing of the first and second immersive media is via a same eNB of the network.

16. The method of claim 13, wherein the first and second requests provide at least a portion of the first service information, wherein the first service information is associated with first service parameters corresponding to the first root ID, and wherein the first and second end user devices are different types of wearable devices.

17. A method of claim 13, comprising:
receiving, by the network server after a conclusion of the first communication service of the first user, a third request from the first end user device for a third communication service, wherein the first end user device is being utilized by a second user;
selecting, by the network server, a third network slice, a third spectrum resource allocation, and a third RAT according to a second root ID provided to the first end user device by the second user; and
providing, over the network, third immersive media for presentation by the first end user device in response to the third request, wherein the third immersive media is provided utilizing the third network slice, the third spectrum resource allocation, and the third RAT.

18. The method of claim 13, further comprising:
communicating with a second wearable device of a second user to facilitate the second wearable device presenting a portion of an XR world associated with the XR service via the second wearable device to the second user.

19. The method of claim 13, wherein the second communication service is provided after the first communication service has ended.

20. A non-transitory machine-readable medium, comprising executable instructions that, when executed by a processing system including a processor of a device, facilitate performance of operations, the operations comprising:

receiving first input that indicates a first root ID of a first user;

providing a first request to a network server for a first communication service;

receiving first immersive media for presentation in response to the first request, wherein the first immersive media is provided over a network utilizing a first network slice, a first spectrum resource allocation, and a first Radio Access Technology (RAT) that is selected according to first service information corresponding to the first root ID, wherein the first immersive media is part of an extended reality (XR) service, and wherein the device is a first wearable device;

presenting the first immersive media;

receiving second input that indicates a second root ID of a second user;

providing a second request to the network server;

receiving second immersive media for presentation in response to the second request, wherein the second immersive media is provided over the network utilizing at least one of a second network slice, a second spectrum resource allocation, or a second RAT that is selected according to second service information corresponding to the second root ID;

presenting the second immersive media; and communicating with a second wearable device of the first user to facilitate the second wearable device to present a portion of the XR service, wherein the communicating with the second wearable device includes providing information that enables synchronizing the first immersive media with stimuli provided by the second wearable device.

* * * * *